United States Patent [19]

Eckel et al.

[11] Patent Number: 5,799,687

[45] Date of Patent: Sep. 1, 1998

[54] SECURITY VALVE ASSEMBLY

[75] Inventors: John Eckel, Hazel Green, Wis.; Joseph Tilp, Dubuque, Iowa

[73] Assignee: A. Y. McDonald Mfg. Co., Dubuque, Iowa

[21] Appl. No.: 723,223

[22] Filed: Sep. 27, 1996

[51] Int. Cl.⁶ .................................................. F16K 35/00
[52] U.S. Cl. ............................................. 137/385; 70/179
[58] Field of Search ............................. 137/385; 70/179

[56] References Cited

U.S. PATENT DOCUMENTS

| | | | |
|---|---|---|---|
| 1,111,618 | 9/1914 | Schoof | 70/179 |
| 1,621,876 | 3/1927 | Doerr | 137/385 |
| 4,971,289 | 11/1990 | Pietras | 137/385 |

FOREIGN PATENT DOCUMENTS 1017430  10/1957  Germany .................. 137/385

*Primary Examiner*—A. Michael Chambers
*Attorney, Agent, or Firm*—Wood, Phillips, VanSanten, Clark & Mortimer

[57] ABSTRACT

Difficulties with accessibility to a valve and the entry of precipitation into a locking mechanism for the valve are eliminated in a security valve assembly that includes a valve body (22), (100) including a pair of spaced ports (12), (18); (102), (104) with a passage (38), (106) extending between the ports. A valve member (26), (110) is rotatable within the body between an open position and a closed position and may be rotated by an actuator (32), (118). The body (22), (100) includes a lock receiving chamber (50), (130) for removably receiving a lock (52), (136) in a direction generally transverse to the passage (38), (106).

11 Claims, 3 Drawing Sheets

SECURITY VALVE ASSEMBLY

FIELD OF THE INVENTION

This invention relates to valve assemblies for use in natural gas or liquified petroleum gas distribution systems. More specifically, this invention relates to a security valve that may be locked or unlocked and which is ideally suited for use in such systems.

BACKGROUND OF THE INVENTION

U.S. Letters Pat. No. 5,046,523 issued Sep. 10, 1991 to Horhota describes a lock core service valve that is particularly suited as a security valve for use in gas distribution systems. For any of a variety of generally obvious reasons, it is desirable to have valves in such systems capable of being locked securely in such a way that the locks cannot be easily defeated. As point out in the '523 patent, externally exposed locks, shields, shrouds, wings and locking apertures can be easily lost, sawed, shattered, pried, sheared or otherwise broken and the locking securing circumvented. Early attempts to solve such difficulties resulted in internal locking mechanisms that were extremely complicated.

Attempts at simplifying the valves apparently resulted in valve housings that apparently gave some indication as to where attempts might be made to circumvent the locking mechanism. This visual indication apparently led to numerous mutilated valves which had to eventually be replaced even if the valves were successful in preventing a breach of security.

To overcome these problems, Horhota proposed the provision of a locking pin passageway for a common lock of the type known as a "barrel lock" which is parallel to the inlet and outlet piping and in close proximity to it. While this construction eliminated a number of defects of the prior art, it gave rise to new ones.

Specifically, gas distribution systems, at the point where they enter a building structure, typically include a relatively lengthy run of vertical piping adjacent the building in which the security valve is located. As a consequence, the passageway within the valve is generally vertical as will be the locking pin passageway.

If the locking pin passageway opens upwardly, precipitation and grime from the environment will settle on the valve and enter the locking pin passageway. In some cases, corrosion may result, but in all cases, the foreign material within the locking mechanism may accumulate to the point where it is difficult or even impossible to remove the barrel lock from the locking pin passageway to allow the valve setting to be changed.

Alternatively, if the locking pin passageway opens downwardly, it will be difficult to achieve access to the barrel lock to operate and remove the same when the valve position is to be changed.

Moreover, valves in gas distribution systems are typically made of brass which is a relatively soft metal. As a consequence, depending upon the specific design of the valve, it is possible to apply sufficient rotative force to the valve actuator to the point where the soft metal will yield and distort allowing the valve to be shifted even with the lock in place, albeit at the cost of partial or entire destruction of the valve.

The present invention is directed to overcoming one or more of the above problems.

SUMMARY OF THE INVENTION

It is the principal object of the invention to provide a new and improved security valve. More specifically, it is an object of the invention to provide such a valve wherein the locking mechanism is not susceptible to the collection of precipitation or other materials in the environment and wherein the security feature of the valve cannot be defeated because of the use of relatively soft metals in the construction of the valve.

According to one facet of the invention, the foregoing object is achieved in a security valve assembly that includes a valve body having a pair of spaced ports and a passage extending between the ports. A valve receiving chamber is located in the body and is located in intersecting relation with the passage between the ports. A valve member is disposed in the chamber and means are provided for journalling the valve member for rotation between a closed position blocking the passage and an open position establishing fluid communication between the ports. An actuator is provided for the valve and is rotatable about an axis. The actuator also has a rotative force receiving formation exterior of the bodies whereby the application of a rotative force to the formation will normally cause the actuator to rotate the valve between the valve's positions. A lock receiving chamber is located in the body and opens to the exterior thereof. The same is displaced from the axis of rotation of the actuator and is located to removably receive a lock in a direction generally transverse to the passage. A lock receiving bore or notch is disposed in the actuator and is displaced from the axis of rotation thereof and is alignable with the lock receiving chamber when the valve is in the closed position. A removable lock is disposable in the lock receiving chamber and the lock receiving bore or notch when the valve is in the closed position for locking the actuator against rotation to thereby prevent the valve from being open.

As a result of this construction, whether the valve is installed with the passage vertical or horizontal or a combination thereof, the lock receiving chamber can be located to open in a horizontal direction to be readily accessible without being positioned to collect precipitation and/or grime from the environment.

According to another facet of the invention, there is provided a security valve assembly that includes a valve body with a pair of spaced ports and a passage extending between the ports along with a valve receiving chamber as mentioned before. A valve member is disposed in the chamber and means journal the same for movement between positions opening and closing the passage. An actuator as mentioned previously is also provided. According to this aspect of the invention, the actuator is made of a relatively soft metal and lock receiving means are provided in the body and in the actuator and are alignable with one another when the valve is in the closed position. The lock receiving means in the actuator is at least in part defined by hardened metal set in the actuator. Again, a lock is removably receiving in the lock receiving means.

The invention may include a lock receiving chamber that is parallel to the axis of rotation of the valve actuator.

In a preferred embodiment, the valve assembly is incorporated in a meter bar.

According to the invention, the valve member can be either a ball valve or a plug valve.

Preferably when the valve is a plug valve, the actuator and the valve member are an integral, one piece structure.

In a highly preferred embodiment, the hardened metal comprises a pair of pins sandwiching the lock receiving notch or bore in the actuator.

Other objects and advantages will become apparent from the following specification taken in connection with the accompanying drawings.

3

DESCRIPTION OF THE PREFERRED EMBODIMENTS

Figure 1:
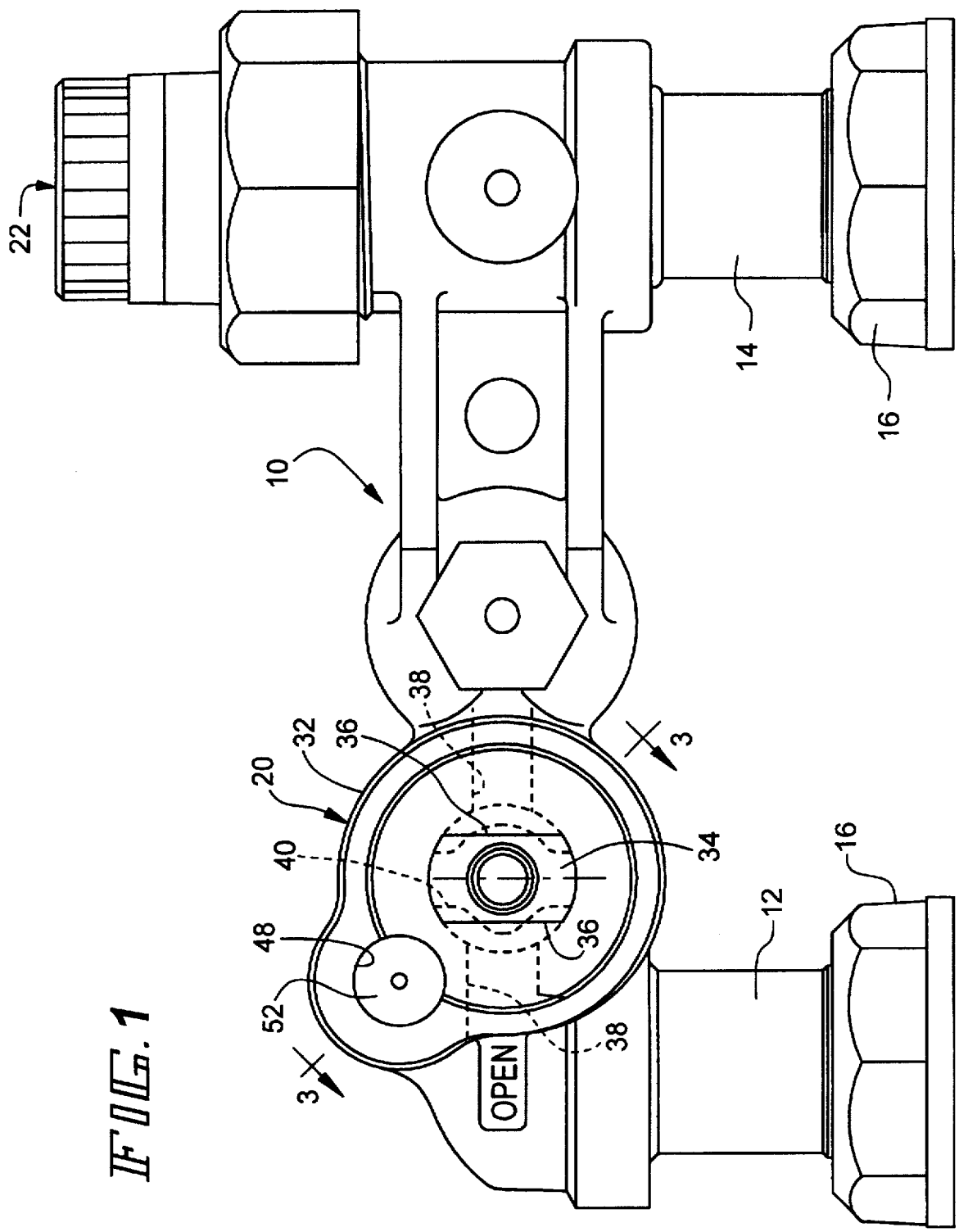
FIG. 1 is a side elevation of one embodiment of a security valve made according to the invention embodied in a meter bar.
Figure 2:
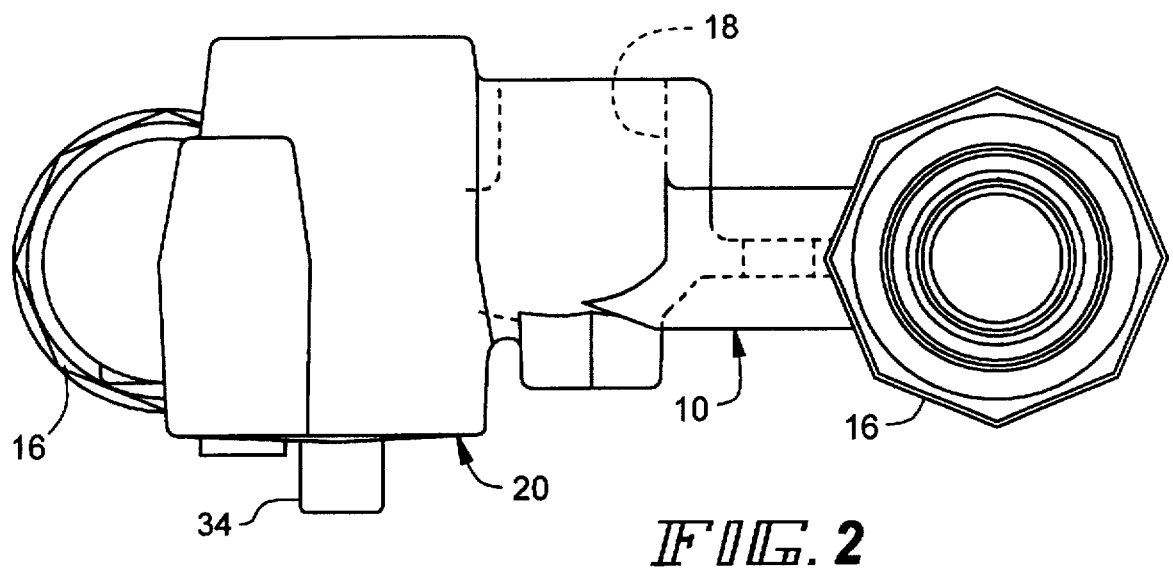
FIG. 2 is a plan view of the valve.
Figure 3:
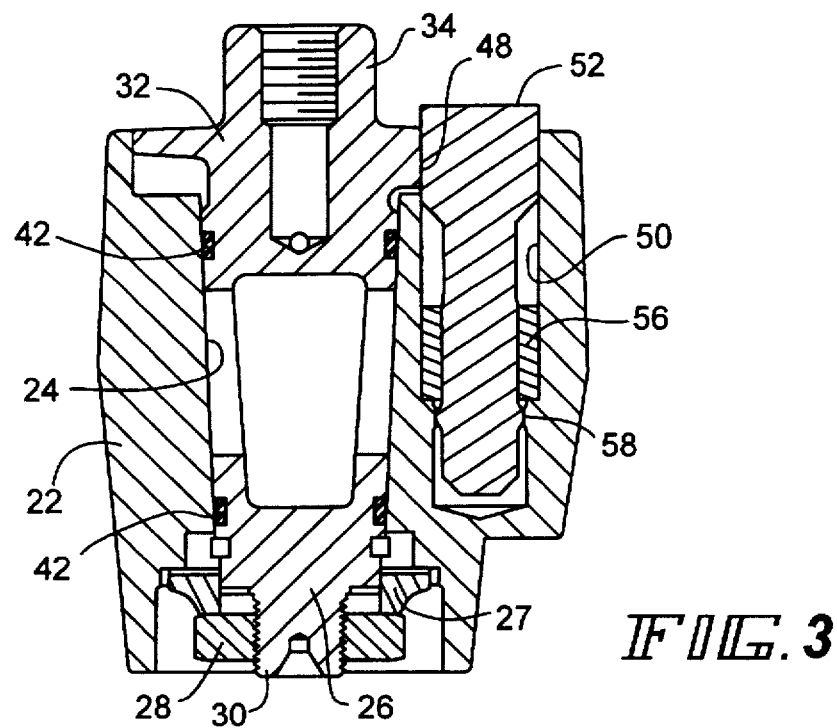
FIG. 3 is a sectional view taken approximately along the line 3—3 in FIG. 1.
Figure 4:
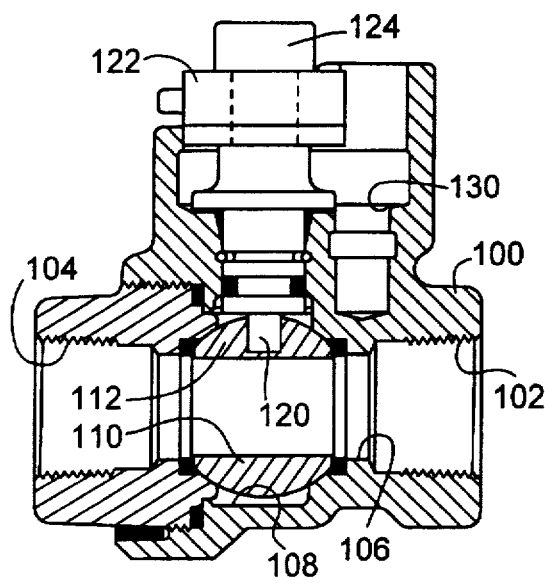
FIG. 4 is a sectional view of a modified embodiment of the invention illustrating a valve configuration in an open condition.
Figure 6:
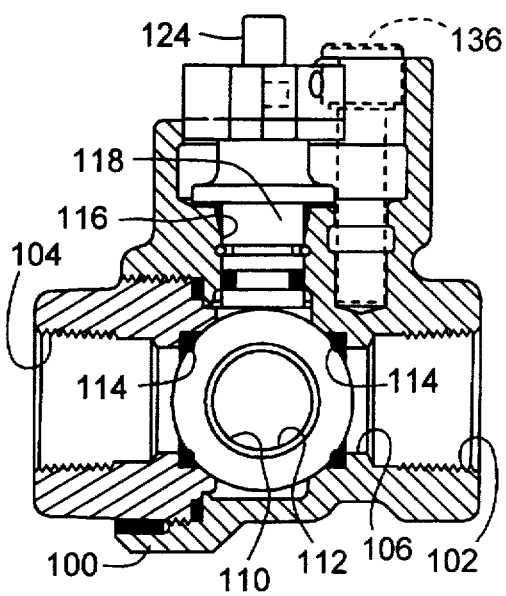
FIG. 6 is a sectional view like that shown in FIG. 4, but with the valve in a closed position.

An exemplary embodiment of a security valve made according to the invention is illustrated in FIGS. 1–3 as incorporated in a meter bar for use in a gas distribution system. However, it is to be understood that the valve of the present invention can be a stand alone valve and may be used in other types of systems as desired.

Referring to FIGS. 1 and 2, a cast meter bar, generally designated 10, optionally includes downwardly depending tubes 12 and 14, each supporting a rotatable nut 16 by which a gas meter or the like may be mounted to the bar 10.

At approximately its mid point, and at the rear, the bar 10 includes an inlet port 18. A valve made according to the invention, generally designated 20, is located between the inlet port 18 and the port defined by the outlet tube 12. The tube 14 connects through the bar 10 to an outlet 22 to which gas is put after being metered.

As seen in FIGS. 1–3, the valve 20 includes a valve body 22 formed as an integral part of the meter bar 10. Within the body 22 is a valve chamber 24 and a conventional plug valve 26 is located in the chamber 24. As is well known, the plug valve 26 is tapered and will conventionally be held in place against a washer 27 by a nut 28 fastened on a threaded stem 30 on the smaller end of the valve 26.

The opposite end of the valve 26 is designated 32 and serves as a valve actuator. It includes an operating key 34 having opposed flat sides 36 (FIG. 1) which is adapted to receive a rotative force which may be employed to rotate the valve 26 90° between open and closed positions. In this regard, as seen in FIG. 1, the valve body 22 includes an interior passageway 38 which connects respectively to the inlet 18 and the tube 12 and which is intersected by the valve chamber 24. The valve itself includes a through passage 40. As seen in FIG. 1, the passage 40 is blocked by the walls of the valve chamber 24 corresponding to a closed valve position. However, it can also be seen that by rotating the actuator 32 by applying a rotative force to the operating key 34, the same may be rotated 90° to align the through passage 40 with the passage 38, one may establish fluid communication from the inlet 10 to the tube 12.

Appropriate seals 42 are employed as required and as seen in FIG. 1, the actuator 32 includes an arcuate notch or partial bore 48 which opens to the exterior of the valve body 22. A complimentary partial bore is designated 50 and is formed in the valve body 22 as shown in FIG. 3. These partial bores 48, 50 are lock receiving chambers or bores or notches for a conventional barrel lock 52. They are arranged so that when the valve 26 is in the closed position illustrated in FIG. 1, they are aligned so that they may substantially wholly and removably receive the barrel lock 52. With the barrel lock 52 in place, it will be appreciated that rotation of the actuator 32 is prevented.

Desirably, and as shown in FIG. 3, the bore 50 and the valve body 22 may include a hardened insert 56 against which the locking teeth 58 of the barrel lock 52 may lodge.

It is to be particularly noted that the bore defined by the partial bores 48 and 50 is oriented so as to be transverse to the passage 38 of the valve body 20. Generally, this bore will also be parallel to the axis of rotation of the valve actuator 32, though spaced from the walls of the valve chamber 24 which serve as the journal of the actuator 32 and the valve 26 within the body 22 as is well known. The net result of such a construction provides that a barrel lock 52 may be removed from the same side of the valve body 22 as is addressed in changing the valve position by applying a rotative force to the operating key 34. At the same time, those skilled in the art will recognize that with such a relationship, the valve body can always be oriented because the barrel lock 52 and its partial bores 48, 50 to open to a side of the valve body 22 so that it neither has to open (1) upwardly whereat they would collect rain water and other material from the environment, or (2) downwardly, where accessibility might be difficult. In short, accessibility and operability are vastly improved.

As alluded to generally previously, the invention is not limited to meter bars but may be advantageously employed in valves alone if desired; and FIGS. 4–7, inclusive show such an embodiment. A valve body 100 is provided and is, in turn, provided with opposed ports 102 and 104 which are interconnected by a passage 106. The passage 106 is intersected by a valve chamber 108 which receives a ball valve element 110 which in turn has a through passage 112. When the ball valve element 110 is in the position illustrated in FIG. 4, the ports 102 and 104 are connected whereas when the ball valve element 110 is rotated 90° to the position illustrated in FIG. 6, the passage 106 will be blocked. Again, conventional seals 114 are provided.

The valve body 100 includes a bore 116 that extends to the valve chamber 108 and which journals a valve stem or actuator 118. The valve actuator 118 terminates in a key 120 received in a recess within the ball valve element 110 such that rotation of the former will result in rotation of the latter between the positions illustrated in FIGS. 4 and 6.

Opposite of the key 120, the actuator includes an external end 122 terminating in an operating key 124 which is adapted to receive a rotative force just as the operating key 34.

Figure 5:
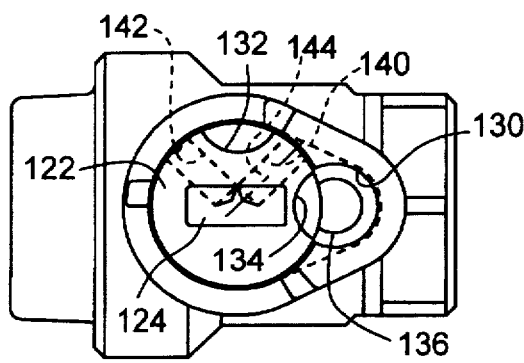
FIG. 5 is plan view of the valve in the configuration of FIG. 4.
Figure 7:
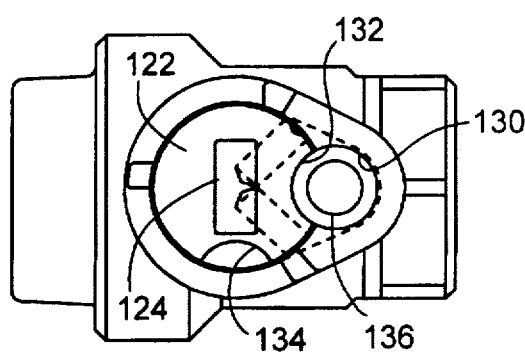
FIG. 7 is a view similar to FIG. 5, but showing the valve in a closed position.

To one side of the bore 116 is a second bore 130 which is a lock receiving bore. As seen in FIGS. 5 and 7, the actuator external section 122 includes a pair of partial bores 132 and 134 which are spaced 90°. The arrangement is such that when the valve is in the open position illustrated in FIG. 4, the partial bore 134 will align with the bore 130 to substantially wholly receive a conventional barrel lock 136 by which the valve may be locked in the open position. On the other hand, when the actuator 122 has been rotated 90° to the position shown in FIG. 7, the valve element 110 will be in a closed position and the partial bore 132 will align with the bore 130 for receipt of the barrel lock 136 to lock the valve in the closed position.

Because the valve components frequently are made of brass, which is a relatively soft metal, there is a possibility that someone will try to defeat the security of the valve by applying a rotative force to the operating key 124 with the thought that deforming the external end 122 of the relatively soft actuator, and specifically the area around the partial bore 132 or 134 as the case may be, will allow rotation the ball valve element 110 and changing of the setting of the valve.

To prevent this from occurring, the invention contemplates that a pair of radial bores 140 and 142 be located in the external end 122 to open to opposite sides of the partial bore 132. Hardened steel pins 144 are located in the bores 140 and 142 and thus serve to reinforce the external end 122 against deformation should someone try to change the valve condition with the barrel lock 136 still in place. If desired, pins 144 could also be used to sandwich the partial bore 134 if desired, but generally speaking, such will be omitted since the principal concern is for unauthorized opening of the valve as opposed to unauthorized closing of the same.

It will again be noted that the bore 130 and the partial bores 132 and 134 are transverse to the passage 106. Preferably, again, they are parallel to the axis of rotation of the actuator 118 as well.

This orientation of the components again is responsible for the high degree of accessibility while preventing the entry of precipitation and/or material from the environment into the locking part of the system. Specifically, it allows the valve body 100 to be installed in a configuration where the barrel lock 136 can be extracted from a side of the valve rather than from either the top or the bottom, thereby avoiding the problems mentioned previously.

We claim:

1. A security valve assembly comprising:
   a valve body including a pair of spaced ports and a passage extending between said ports;
   a valve receiving chamber in said body and located in intersecting relation with said passage between said ports;
   a valve member in said chamber;
   means journalling said valve member for rotation between a closed position blocking said passage and an open position establishing fluid communication between said ports;
   an actuator for said valve rotatable about an axis and having a rotative force receiving formation exterior of said body whereby the application of a rotative force to said formation will normally cause said actuator to rotate said valve between said positions;
   a lock receiving partial bore in said body and opening to the exterior thereof adjacent said force receiving formation and displaced from said axis and located to removably receive a lock in a direction generally transverse to said passage;
   a lock receiving arcuate, partial bore or notch in said actuator and displaced from said axis and alignable with said lock receiving partial bore in said body when said valve is in said closed position to form a barrel lock receiving cavity in both said body and said actuator; and
   a removable barrel lock substantially wholly disposable in said lock receiving cavity when said valve is in said closed position for locking said actuator against rotation to thereby prevent said valve from being opened;
   whereby, whether said valve is installed with said passage vertical or horizontal or a combination thereof, said lock receiving chamber may be caused to open in a horizontal direction to be readily accessible without being positioned to collect precipitation or grime.

2. The security valve assembly of claim 1 wherein said lock receiving partial bore in said body is parallel to said axis.

3. The security valve assembly of claim 1 wherein said valve assembly is incorporated in a meter bar.

4. The security valve assembly of claim 1 wherein said valve member is a ball valve.

5. The security valve assembly of claim 1 wherein said valve member is a plug valve.

6. The security valve assembly of claim 1 wherein said actuator and said valve member are an integral, one piece structure.

7. The security valve assembly of claim 1 wherein said actuator is formed of a relatively soft metal and further includes hardened metal inserts sandwiching said lock receiving arcuate partial bore or notch in said actuator.

8. A security valve assembly comprising:
   a valve body including a pair of spaced ports and a passage extending between said ports;
   a valve receiving chamber in said body and located in intersecting relation with said passage between said ports;
   a valve member in said chamber;
   means journalling said valve member for rotation between a closed position blocking said passage and an open position establishing fluid communication between said ports;
   an actuator for said valve rotatable about an axis and having a rotative force receiving formation exterior of said body whereby the application of a rotative force to said formation will normally cause said actuator to rotate said valve between said positions;
   said actuator being made of a relatively soft metal;
   lock receiving means in said body and said actuator and alignable with one another when said valve is in said closed position, said lock receiving means in said actuator being at least in part defined by hardened metal set in said actuator; and
   a lock removably received in said lock receiving means.

9. The security valve assembly of claim 8 wherein said lock receiving means are oriented to be generally transverse to said passage.

10. The security valve assembly of claim 9 wherein said lock receiving means are generally parallel to said axis.

11. A security valve assembly comprising:
   a valve body including a pair of spaced ports and a passage extending between said ports;
   a valve receiving chamber in said body and located in intersecting relation with said passage between said ports;
   a valve member in said chamber;
   means journalling said valve member for rotation between a closed position blocking said passage and an open position establishing fluid communication between said ports;
   an actuator for said valve rotatable about an axis and having a rotative force receiving formation exterior of said body whereby the application of a rotative force to said formation will normally cause said actuator to rotate said valve between said positions;
   said actuator being formed of a generally soft metal;
   said lock receiving bore or notch being at least partially defined by hard metal set in said actuator.

* * * * *